US011710023B2

(12) United States Patent
Yun et al.

(10) Patent No.: US 11,710,023 B2
(45) Date of Patent: Jul. 25, 2023

(54) PERMANENT ATTACHMENT TYPE UHF BAND RFID TIRE TAG AND MANUFACTURING METHOD THEREOF

(71) Applicant: ASIANA IDT INC., Seoul (KR)

(72) Inventors: Jong Sup Yun, Incheon (KR); Uh Chul Jeon, Siheung-Si (KR)

(73) Assignee: ASIANA IDT INC., Seoul (KR)

( * ) Notice: Subject to any disclaimer, the term of this patent is extended or adjusted under 35 U.S.C. 154(b) by 0 days.

(21) Appl. No.: 17/256,411

(22) PCT Filed: Apr. 19, 2019

(86) PCT No.: PCT/KR2019/004792
§ 371 (c)(1),
(2) Date: Dec. 28, 2020

(87) PCT Pub. No.: WO2020/004797
PCT Pub. Date: Jan. 2, 2020

(65) Prior Publication Data
US 2021/0271951 A1    Sep. 2, 2021

(30) Foreign Application Priority Data
Jun. 28, 2018    (KR) .................... 10-2018-0075035

(51) Int. Cl.
*G06K 19/077*    (2006.01)
*C09J 121/00*    (2006.01)
(Continued)

(52) U.S. Cl.
CPC ...... *G06K 19/07764* (2013.01); *C09J 121/00* (2013.01); *C09J 133/08* (2013.01); *C09J 183/00* (2013.01)

(58) Field of Classification Search
CPC .............. G06K 17/00; G06K 7/10376; G06K 7/10346; G06K 7/10356; G06K 19/07764;
(Continued)

(56) References Cited

U.S. PATENT DOCUMENTS

2005/0197074 A1*  9/2005  Cullen ............. G06K 19/07718
                                                            455/90.3
2006/0290505 A1* 12/2006  Conwell .......... G06K 19/07764
                                                            340/572.1
(Continued)

FOREIGN PATENT DOCUMENTS

GB          2252529 A  *  8/1992  ........... A45D 29/004
JP       2002-366921 A     12/2002
(Continued)

OTHER PUBLICATIONS

Lim et al., "Design and Development of a Miniaturized Embedded UHF RFID Tag for Automotive Tire Applications" (Year: 2005).*
(Continued)

*Primary Examiner* — Thien T Mai
(74) *Attorney, Agent, or Firm* — Knobbe, Martens, Olson & Bear, LLP

(57) ABSTRACT

The present invention relates to a permanently attached UHF band RFID tire tag and a manufacturing method thereof, and more specifically, the present invention relates to a permanently attached UHF band RFID tire tag and a manufacturing method thereof, which is attached to a tire surface during the manufacturing process of a tire in a high-temperature and high-pressure environment, enabling the management of tire manufacturing history from the beginning of the production to product shipment, and thereafter, the durability is maintained even in the flexing motion of a tire that occurs while the tire is installed and operated in a vehicle such that chip damage of a tag and tag detachment from the tire do not
(Continued)

occur, and therefore, it enables RFID communication to be performed without obstacles until the end of a tire life.

19 Claims, 11 Drawing Sheets

(51) Int. Cl.
*C09J 133/08* (2006.01)
*C09J 183/00* (2006.01)

(58) Field of Classification Search
CPC ......... G06K 19/07749; G06K 7/10099; G06K 19/0723; G06K 7/10405; C09J 121/00; C09J 133/08; C09J 183/00; H01Q 1/2225; H01Q 1/2241; H01Q 1/2216; H01Q 1/22; H01Q 9/0414; H01Q 15/14; H01Q 3/44; H01Q 5/49; H01Q 7/00; H01Q 9/0407; B60C 23/0408; B60C 23/0433; B60C 23/041; B60C 23/0449; B60C 19/00; B60C 11/24; B60C 23/00; B60C 9/00; B60C 23/0413; B60C 23/0452; B60C 11/246

See application file for complete search history.

(56) References Cited

U.S. PATENT DOCUMENTS

| | | | |
|---|---|---|---|
| 2007/0158436 A1 | 7/2007 | Ichikawa et al. | |
| 2012/0073717 A1 | 3/2012 | Agostini et al. | |
| 2012/0273577 A1* | 11/2012 | Kim | G06K 19/07722 |
| | | | 235/488 |
| 2013/0096369 A1* | 4/2013 | Folkers | A01K 29/005 |
| | | | 600/33 |
| 2017/0277992 A1 | 9/2017 | Janko et al. | |
| 2017/0316299 A1* | 11/2017 | Ritamäki | G06K 19/07749 |
| 2021/0216843 A1* | 7/2021 | Mochizuki | G06K 19/07722 |

FOREIGN PATENT DOCUMENTS

| | | | |
|---|---|---|---|
| JP | 2005-216077 A | | 8/2005 |
| JP | 2006-277524 A | | 10/2006 |
| JP | 2009-069935 A | | 4/2009 |
| JP | 2011-221599 A | | 11/2011 |
| JP | 2016-173747 A | | 9/2016 |
| JP | 2018-32264 A | | 3/2018 |
| KR | 10-0609753 B1 | | 8/2006 |
| KR | 10-2007-0012500 A | | 1/2007 |
| KR | 10-0686599 B1 | | 2/2007 |
| KR | 10-2007-0075258 A | | 7/2007 |
| KR | 10-1119989 B1 | | 3/2012 |
| KR | 10-1168570 B1 | | 7/2012 |
| KR | 10-1177911 B1 | | 8/2012 |
| KR | 10-2012-0122670 A | | 11/2012 |
| KR | 10-2016-0050452 A | | 5/2016 |
| KR | 20160050452 A | * | 11/2016 |
| KR | 10-2018-0001162 A | | 1/2018 |

OTHER PUBLICATIONS

International Search Report of PCT Application No. PCT/KR2019/004792—8 pages (dated Aug. 9, 2019).
Extended European Search Report in EP Application No. 19827285.8 dated Feb. 28, 2022 in 8 pages.

* cited by examiner (Prior Art)

(Prior Art)

PERMANENT ATTACHMENT TYPE UHF BAND RFID TIRE TAG AND MANUFACTURING METHOD THEREOF

CROSS-REFERENCE TO RELATED APPLICATION

This application claims priority to and the benefit of Korean Patent Application No. 10-2018-0075035, filed on Jun. 28, 2018, the disclosure of which is incorporated herein by reference in its entirety.

TECHNICAL FIELD

The present invention relates to a permanently attached UHF band RFID tire tag and a manufacturing method thereof, and more specifically, the present invention relates to a permanently attached UHF band RFID tire tag and a manufacturing method thereof, which is attached to a tire surface during the manufacturing process of a tire in a high-temperature and high-pressure environment, enabling the management of tire manufacturing history from the beginning of the production to product shipment, and thereafter, the durability is maintained even in the flexing motion of a tire that occurs while the tire is installed and operated in a vehicle such that chip damage of a tag and tag detachment from the tire do not occur, and therefore, it enables RFID communication to be performed without obstacles until the end of a tire life.

BACKGROUND ART

In general, radio frequency identification (RFID) technology refers to a technology for wirelessly recognizing information at a location separated by a certain distance using radio waves. In order to implement the RFID technology, an RFID tag and an RFID reader are required. The RFID tag includes an antenna and an RFID chip which is an integrated circuit, which record necessary information in advance in the RFID chip and transmit the information to a reader through the antenna. Conventionally, the information stored in the RFID chip is used to identify an object to which the RFID tag is attached.

The difference between RFID and barcode systems is that it uses radio waves instead of reading using light. Therefore, it does not work only at a short distance like a barcode reader, but also it can read tags from a long distance, and even has an advantage of receiving information through an object whose visible distance is not secured.

Such RFID tags are applied to production management and inventory management of various manufactured products, and in particular, these are actively applied to the manufacturing processes of a tire and the inventory management process. In the case of attaching or embedding an RFID tag from the forming step of the manufacture of a tire in order to apply an enterprise resource planning (ERP) system such as production management, post-manufacturing inventory management, or the like during the manufacture of a tire, an RFID tag is exposed to the harsh manufacturing environment of a vulcanization process which is the subsequent process, that is, a high-temperature environment of 150° C. to 230° C. or higher and a high-pressure environment of 30 Bar or more, and a problem occurs in which the RFID tag is damaged during the manufacturing process.

In addition, when the RFID tag is manufactured in a three-dimensional bulk, the RFID tag can be applied without a great deal of trouble in articles without movement. However, when the RFID tag is applied to aircraft tires and vehicle tires, since the RFID tag occupies a certain space inside the tire, the chip area of the RFID tag may be damaged or normal communication may be impossible in the environment of high-speed rotation of the tire and the resulting high temperature and high pressure, and repeated stress due to deformation, and problems may occur in which the attached RFID tag is detached from the tire and the like.

FIG. 1 is a disassembled perspective view of a conventional tire-attached RFID tag. In addition, FIG. 2 is a side cross-sectional view of the tire-attached RFID tag illustrated in FIG. 1.

Referring to FIGS. 1 and 2, a conventional tire-attached RFID tag 10 may include a substrate film 11, a circuit pattern 15 including an antenna pattern formed on the substrate film 11, an RFID chip 13 attached on the substrate film 11 so as to be in electrical contact with the circuit pattern 15, a first adhesive layer 17 disposed on the substrate film 11, and a protective layer 19 disposed on the first adhesive layer 17.

Further, the conventional tire-attached RFID tag 10 may further include a second adhesive layer 18 disposed under the substrate film 11 to adhere the RFID tag 10 to the inner surface of a tire. The substrate film 11 is an element that becomes a substrate on which an antenna pattern and a circuit portion are formed.

The RFID chip 13 communicates with an RFID reader to record various information necessary for the manufacturing process of a tire and the inventory management process to transmit the recorded information, and it is disposed on the upper surface of the substrate film 11 to form an electrical connection with the circuit pattern 15 including the antenna pattern.

The first adhesive layer 17 and the protective layer 19 are sequentially stacked on the substrate film 11. In addition, the second adhesive layer 18 is disposed under the substrate film 11 in order to adhere the RFID tag 10 to the inner surface of the tire.

The above-described conventional tire-attached RFID tag 10 is subjected to repetitive stress in a high-speed rotational environment during tire operation, and since a high-temperature environment is created, the RFID chip 13 may be damaged due to such repetitive, mechanical, and thermal stress during the service life of a tire, and thus, recognition may become impossible, or even the RFID tag 10 may be detached from the tire.

DISCLOSURE

Technical Problem

The present invention was devised to solve the problems of the prior art described above, and the present invention is directed to providing a permanently attached UHF band RFID tire tag and a manufacturing method thereof, which protects an RFID chip to prevent direct damage to the chip, and not only an RFID tag itself, but also a non-contact power supply layer provided with an RFID chip, which is at least the recognition area, is firmly bonded to the tire such that it can be permanently operated until the tire is discarded.

In addition, the present invention is also directed to providing a permanently attached UHF band RFID tire tag and a manufacturing method thereof, which can absorb shock caused by pressure, because a plurality of air gaps having a predetermined space are formed in any one of the adhesive layers, and the nonwoven fabric, which is a random fiber assembly, has a cushioning function of the fiber itself.

Technical Solution

In order to achieve the above-described objects, the present invention provides a permanently attached UHF band RFID tire tag, including a first adhesive layer; a non-contact power supply layer attached to a lower surface of the first adhesive layer, and formed with a conductive antenna pattern and an RFID chip electrically connected thereto; a second adhesive layer wherein the non-contact power supply layer is seated on an upper surface; a parasitic element layer attached to a lower surface of the second adhesive layer, and operated by electromagnetic induction energy radiated from the non-contact power supply layer; and a third adhesive layer wherein the parasitic element layer is attached to an upper surface, and the opposite surface is bonded to one side of an inner surface of a tire.

It is preferable that a protective layer attached to an upper surface of the first adhesive layer is further provided.

In order to prevent arbitrary tag damage by the user, it is preferable that the protective layer has an area of 1.5 to 10 times based on the total area of the non-contact power supply layer to conceal a front surface of the tag.

It is preferable that a barcode, letter, number, or QR code for identifying the RFID tire tag and for identification redundancy in case the RFID tag is damaged is printed or marked on an upper surface of the protective layer.

It is preferable that the protective layer consists of PET, polyimide, or oil paper which enables easy writing of individual tag letters of a barcode, letter, number or QR code because printing or laser marking for RFID is possible.

It is preferable that at least one of the first adhesive layer to the third adhesive layer is formed by applying an adhesive to a nonwoven fabric in which a plurality of air gaps are formed.

It is preferable that the plurality of air gaps are locally different in the filling amount of an adhesive, and the adhesive is filled in surface air gaps more than in deep air gaps.

It is preferable that the adhesive applied to both surfaces of at least one of the first adhesive layer to the third adhesive layer is an acrylic-based adhesive, a silicon (Si)-based adhesive, a mixture of acrylic and enhanced heat-resistant silicon (Si)-based adhesives, or a rubber-based adhesive.

It is preferable that a substrate film constituting the non-contact power supply layer and the parasitic element layer consists of polyimide (PI) or polyethylene terephthalate (PET).

It is preferable that the tag is attached to an inner surface of a tire inner liner by an automatic attaching machine during the manufacturing process of a tire, and the center of the tag is attached to an arbitrary position 10 mm to 80 mm away from a bead.

It is preferable that the tag is provided with a protrusion in which a portion of the tag separated from original release paper becomes a protruding form to reduce adhesive stress of a double-sided adhesive in order to facilitate automatic attachment of the tag by the automatic attaching machine.

It is preferable that the protrusion is provided on both ends or the center of one side of the tag, or the entire side of the tag.

It is preferable that the tag has a shape in which horizontal and vertical four sides are asymmetrical corresponding to a curved shape of the tire.

It is preferable that the tag has a length of one side attached to a first diameter portion of the tire shorter than a length of the other side attached to a second diameter portion of the tire, which is longer than the first diameter portion.

It is preferable that the tag is provided with an indentation in which the centers of both sides are indented.

It is preferable that the tag is composed of at least two sides at both ends.

It is preferable that an ultraviolet (UV) epoxy is coated at a chip portion of the tag.

It is preferable that the tire's flexing motion is prevented from being directly transmitted to the non-contact power supply layer by placing the parasitic element layer between the non-contact power supply layer and the tire, wherein damage to the tag chip is reduced thereby such that the tire tag can be used permanently.

It is preferable that the tag separates the non-contact power supply layer and the parasitic element layer by a second adhesive layer, and allows radiant energy transmitted from the non-contact power supply layer to be transferred to a parasitic element electromagnetically coupled to the non-contact power supply layer.

It is preferable that since the tag is configured such that the non-contact power supply layer and the parasitic element layer are separated and electromagnetically coupled to each other, a phenomenon is prevented in which the performance of the tag deteriorates from an effect of a bead or a metal wire of a tread portion present inside the tire.

It is preferable that the tag prevents a phenomenon in which the recognition performance of the tag is deteriorated due to an effect of a bead or a metal wire of a tread portion present inside the tire as the antenna shape of the non-contact power supply layer consists of a narrow slot closed loop structure.

It is preferable that in order to prevent arbitrary tag damage by the user, at least the first adhesive layer has an area of 1.5 to 10 times based on the total area of the non-contact power supply layer to conceal a front surface of the tag.

Advantageous Effects

According to the present invention as described above, by forming adhesive layers each above and below a non-contact power supply layer, which is a chip area of an RFID tag, an effect can be expected in which the chip is not damaged and is protected against external impact or repeated mechanical and thermal stress.

In addition, by adopting a material similar to the deformation characteristic of a tire, that is, a material composed of a component similar to the component of the tire for the adhesive layer mediated between the tire and the parasitic element layer, the adhesive layer may be interlocked and deformed against repeated deformation of the tire in the process of operating the tire. Therefore, an effect can be expected in which the difference between the deformation behavior of a tire and the deformation behavior of a substrate film may be buffered in the middle, and ultimately, an effect of preventing the substrate film from being detached from the tire can be expected.

In addition, by separating the chip area (a non-contact power supply layer on which the RFID chip is provided) of the RFID tag and the parasitic element area (a parasitic element layer), and by making the chip area more spaced apart from the tire than the parasitic element area, it reduces the influence of the flexing motion generated during the operation process of a tire on the chip area. Therefore, while reducing the risk of damage to the entire tag, the possible occurrence of abnormalities is blocked even in the chip area as much as possible, if an abnormality occurs in the parasitic element area, and thus, an effect of enabling the recognition of information from the chip can be expected in spite of an abnormality in the parasitic element area.

In addition, since a plurality of air gaps having a predetermined space are formed in the first adhesive layer and the nonwoven fabric, which is a random fiber assembly, has a cushioning action of the fibers itself, an effect of absorbing the impact caused by pressure can be expected.

In addition, in an environment where it is difficult to adhere on the tire surface, the nonwoven fabric, in which a plurality of air gaps are formed, can increase the total adhesive area, thereby providing excellent adhesive strength.

In addition, even when a strong external force acts on the RFID tag, the air gap layer of the nonwoven fabric buffers shock transmission by the external force, and thus, an effect of protecting the RFID chip and circuit pattern by attenuating the magnitude of the external force applied to the RFID chip itself can be expected.

MODES OF THE INVENTION

Figure 1:
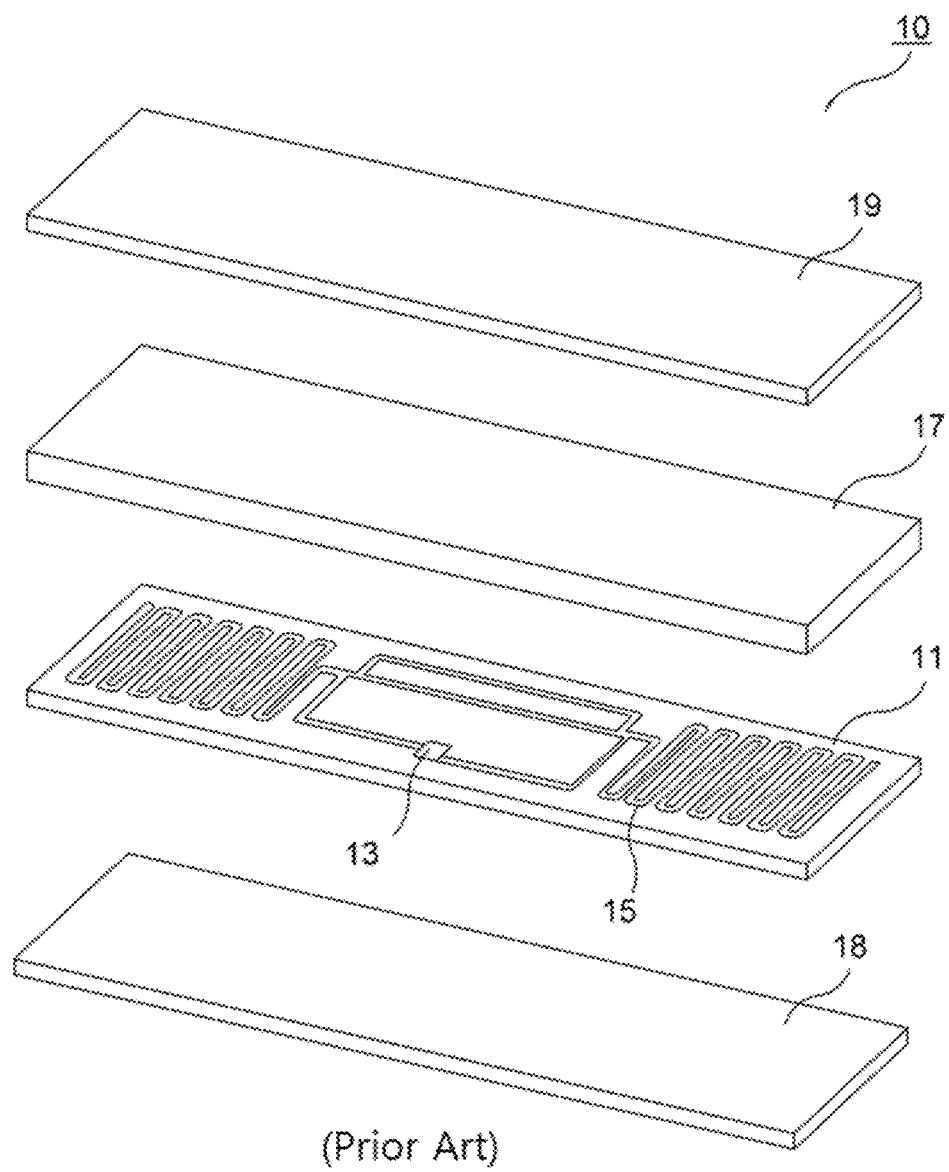
FIG. 1 is a disassembled perspective view of a conventional tire-attached RFID tag.
Figure 2:
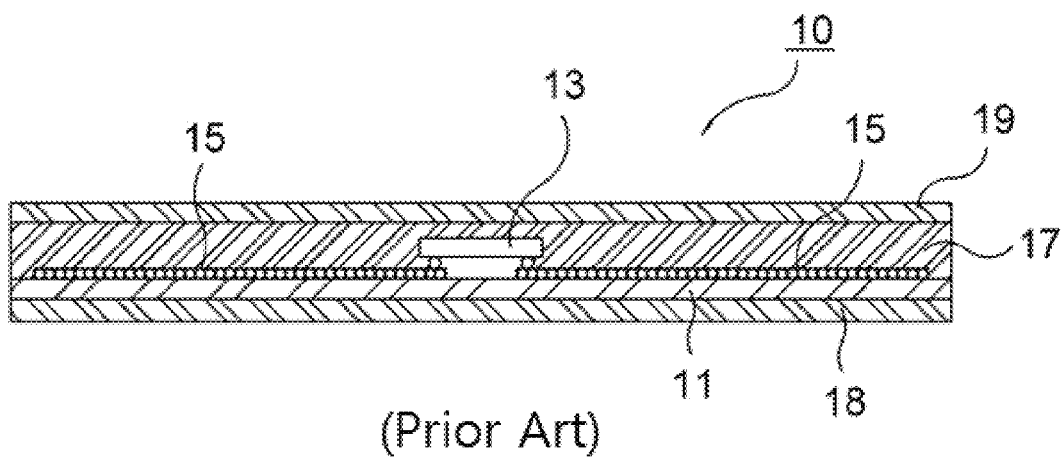
FIG. 2 is a side cross-sectional view of the tire-attached RFID tag illustrated in FIG. 1.

Hereinafter, exemplary embodiments of the present invention will be described in more detail with reference to the accompanying drawings. However, the exemplary embodiments of the present invention may be modified into various other forms, and the scope of the present invention is not limited to the exemplary embodiments described below. The exemplary embodiments of the present invention are provided to describe the present invention more completely to those of ordinary skill in the art to which the present invention pertains. In addition, in describing the present invention, the defined terms are defined in consideration of functions in the present invention, and since these terms may vary according to the intention or custom of a technician engaged in the relevant field, it should not be understood as meaning to limit the technical elements of the present invention.

In order to secure reliability in the environment of high temperature, high pressure, and high-speed rotation during the manufacturing process of a tire or tire operation, the reliability of an antenna pattern and a substrate film accompanied by strong chip bonding is the most important, and the present invention applied a enhanced heat-resistant PET or polyimide film as a substrate film in order to secure such reliability.

In addition, an RFID tag is attached in the tire forming process and the manufacturing process beforehand to perform LOT tracking in the manufacturing process of a tire. Herein, the tag should not be detached after being attached to the tire, and to this end, the present invention prevents the tag from being detached from the tire by applying a special adhesive to the tag.

In addition, if the RFID tag attached to a tire is damaged or a defect occurs during operation of the tire, a new tag may be attached if it is an attachable type, but the history information mounted on the previous tag must be managed separately, and since there may be inconvenience of operating each of two tags, durability management of the tag first attached to the tire is a very important problem. Accordingly, in the present invention, it was focused on the protection of a chip 125 area, which is the core of an RFID tag, and to this end, first, by separating a non-contact power supply layer 120 which is a chip 125 area, and a parasitic element layer 140 which is a parasitic element 143 area, the distance between the attachment surface of the tire and the non-contact power supply layer 120 becomes wider to reduce the effect of the tire's flexing motion, and second, an adhesive layer is formed on the upper and lower portions of the non-contact power supply layer 120 to protect the non-contact power supply layer 120 upward and downward. In addition, a third adhesive layer 150 is further provided between the parasitic element layer 140 and the tire so as to flexibly cope with the tire's flexing motion. Thus, the third adhesive layer 150 buffers the flexing motion such that the effect of the flexing motion is not transmitted to the non-contact power supply layer 120.

Figure 3:
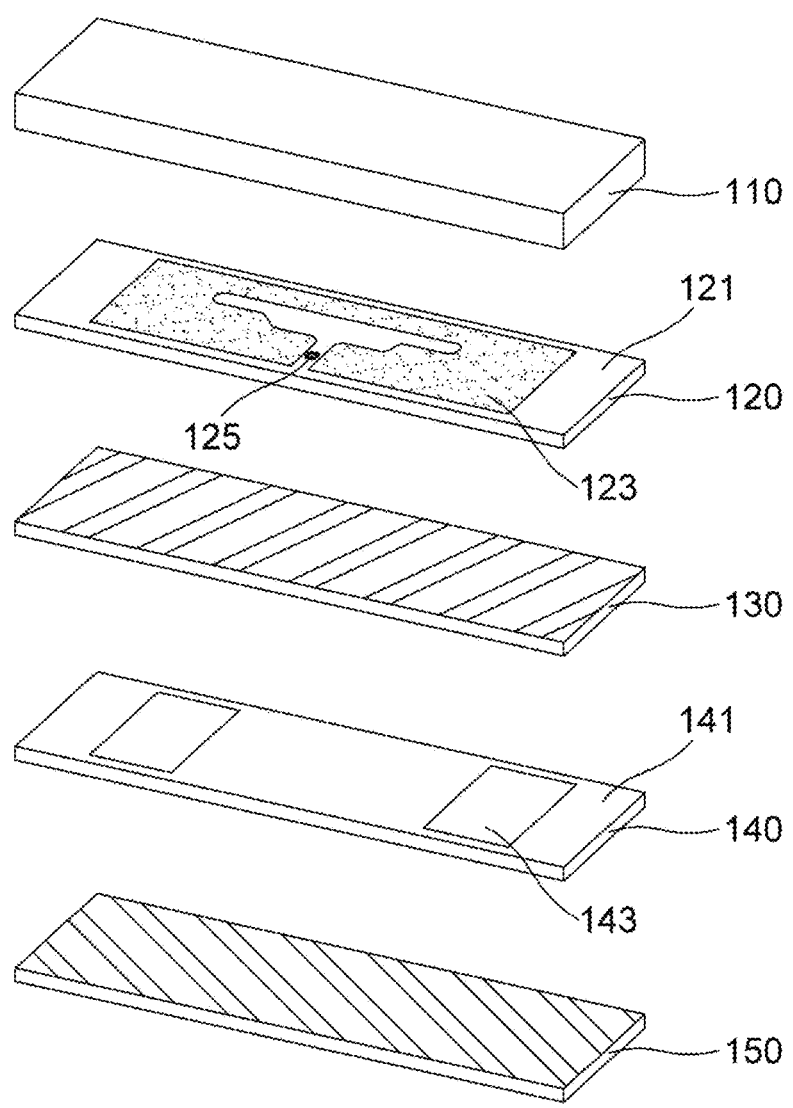
FIG. 3 is a disassembled perspective view of a permanently attached UHF band RFID tire tag according to an exemplary embodiment of the present invention. (new)

FIG. 3 is a disassembled perspective view of a permanently attached UHF band RFID tire tag according to an exemplary embodiment of the present invention. In addition, FIG. 4 is a side cross-sectional view of the permanently attached UHF band RFID tire tag illustrated FIG. 3.

Figure 4:
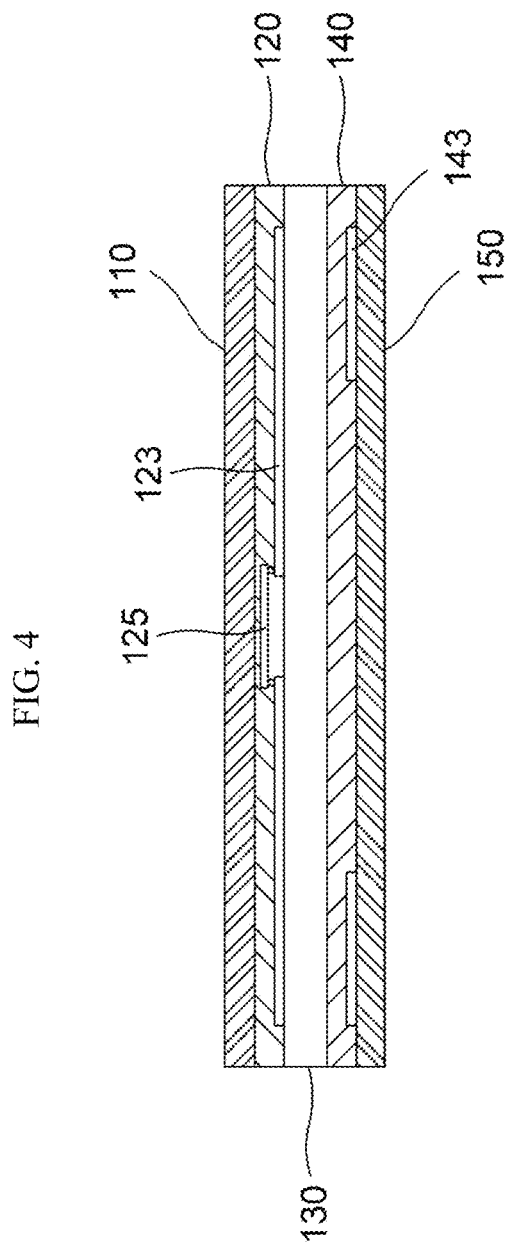
FIG. 4 is a side cross-sectional view of FIG. 3. (new)

Referring to FIGS. 3 and 4, a permanently attached UHF band RFID tire tag 100 according to an exemplary embodiment of the present invention is configured by including a first adhesive layer 110; a non-contact power supply layer 120 attached to a lower surface of the first adhesive layer 110, and formed with a conductive antenna pattern and an RFID chip 125 electrically connected thereto; a second adhesive layer 130 wherein the non-contact power supply layer 120 is seated on an upper surface; a parasitic element layer 140 attached to a lower surface of the second adhesive layer 130, and operated by electromagnetic induction energy radiated from the non-contact power supply layer 120; and a third adhesive layer 150 wherein the parasitic element layer 140 is attached to an upper surface, and the opposite surface is bonded to one side of an inner surface of a tire.

A protective layer 160 may be further provided on the first adhesive layer 110, and a barcode, letter, number or QR code for identifying the RFID tire tag and for identification redundancy may be printed or marked on an upper surface of the protective layer 160.

Herein, in order to prevent arbitrary tag damage by the user, it is preferable that the first adhesive layer 110 or the protective layer 160 has an area of 1.5 to 10 times based on the total area of the non-contact power supply layer 120 to conceal a front surface of the tag. This method may be called a semi-embedded method, in which at least the first adhesive layer may be made of a material similar to that of a tire, and since it is almost integrated with the tire after the curing process, it is the same as if the tag is embedded. Since the protective layer 160 is also difficult to be seen after the curing process during the manufacturing process of a tire, it is the same as if the tag is embedded even in this case.

Moreover, at least the first adhesive layer 110 or the protective layer 160 has an area of 1.5 to 10 times based on the total area of the non-contact power supply layer 120 to conceal the front surface of the tag, and during the manufacturing or flexing motion process of a tire, even if the tag is detached from the tire, the first adhesive layer 110 or the protective layer 160 serves as a pocket, and the tag is maintained in a seated state such that the tag is not detached from the first adhesive layer 110 or the protective layer 160 to protect the tag.

In addition, although not illustrated, release paper may be further attached on the third adhesive layer 150. Since the release paper is a conventional configuration, detailed descriptions of functions, forms, and the like are omitted.

In order to facilitate such printing and marking, the protective layer 160 may consist of PET, polyimide, or dispersing paper for easy writing. However, the material for which the above writing is easy is not limited to the above materials, and since it is possible to adopt other materials available, the material should not be limited to those listed above.

The non-contact power supply layer 120 includes a substrate film 121, a conductive circuit pattern 123 including a conductive antenna pattern formed by etching or deposition on the substrate film 121, and an RFID chip 125 attached on the substrate film 121 to be electrically connected to the conductive circuit pattern 123.

The substrate film 121 is an element that serves as a substrate on which an antenna pattern and a circuit portion are formed, and may be made of a material having heat resistance and pressure resistance, and having a flexible material that is easily attached to a curved surface. The contents described below are applied equally to the substrate film 141 on which the parasitic element 143 is formed. That is, the substrate film 121 and the substrate film 141 may be made of the same material.

For example, the substrate film 121 may consist of polyimide (PI) or heat-resistant polyethylene terephthalate (PET) that does not melt at a high temperature of at least 230° C. and is easily attached to a curved surface inside a tire. However, it is not limited thereto.

In this way, the tire-attached RFID tag 100, to which the substrate film 121 made of polyimide (PI) or heat-resistant polyethylene terephthalate (PET) is applied, is injected together when a casting for tire manufacturing is injected into a mold. In this case, even when the temperature of the casting is 230° C. or more, the polyimide (PI) or heat-resistant polyethylene terephthalate (PET) film does not melt, and is formed integrally to operate with the tire when the tire material solidifies. The pressure generated when the tire is formed is absorbed by each adhesive layer, in particular, the first adhesive layer 110 such that no problem occurs in the operating performance of the tag for the history management of the tire, and accordingly, the tire-attached RFID tag 100 may have mechanical reliability.

In addition, even when the tire-attached RFID tag 100 is attached to the surface of the inner liner of the tire, sufficient flexibility may be secured, and thus, it is easy to attach to curves, and since it is very light and thin, it may prevent separation, damage, and malfunction from the tire even in the high-speed rotation environment in which the tire is operated or under high-temperature and high-pressure conditions. Nevertheless, since the characteristics of the substrate film 121 and the characteristics of the tire are different, particularly in the present invention, the third adhesive layer 150 more similar to the material of the tire is interposed between the tag and the tire such that the attachment of the tag is made to be more sustainable.

The circuit pattern 123 may be generated through an etching process after printing a paste of a metal material having conductivity or depositing a thin metal film on the substrate film 121. Since this is a conventional process, detailed description will be omitted.

The circuit pattern 123 may include an antenna pattern whose length is determined in proportion to the length of the wavelength of radio waves so as to resonate with radio waves provided by an external transponder (e.g., an RFID reader). Conventionally, the shorter the wavelength of the radio wave, the shorter the length of the antenna pattern, and it increases in the opposite case. In one exemplary embodiment of the present invention, the antenna pattern included in the circuit pattern 123 may be configured in a narrow slot closed loop structure. Accordingly, it is possible to prevent deterioration of the recognition performance of a tag from the influence of a bead or a metal wire of a tread portion present inside the tire. However, although not illustrated in detail in the drawings, the circuit pattern 123 may further include various types of patterns for forming a match between the RFID chip 125 and the antenna pattern.

The RFID chip 125 is an element that communicates with an RFID reader to record various information necessary for the manufacturing process and the inventory management process of a tire and communicates with the RFID reader to transmit the recorded information. It is disposed on the substrate film 121 to form an electrical connection with the circuit pattern 123 including the antenna pattern.

The RFID chip 125 may be electrically connected to the circuit pattern 123 through various device bonding techniques known in the art, but a flip chip bonding technique that is relatively simple in the process and consumes less cost may be applied to form an electrical connection between the RFID chip 125 and the circuit pattern 123.

The second adhesive layer 130 and the third adhesive layer 150 are layers provided close to the tire, and therefore, it is preferable to be made of materials capable of maintaining durability even at strong heat and high temperatures generated during the operation of a tire. The first adhesive layer to the third adhesive layer, particularly the third adhesive layer 150, are adhesives constituting the same to maintain durability, and it is preferable to adopt an acrylic-based adhesive, a silicon (Si)-based adhesive, a mixture of acrylic and enhanced heat-resistant silicon (Si)-based adhesives, or a rubber-based mixed adhesive.

Among these, silicone and rubber are similar in physical properties to tires, and therefore, in the present invention, there is a characteristic in that silicone and rubber are used as adhesive components. For example, when silicone or rubber is mixed with acrylic, an adhesive having physical properties having an intermediate value between the tire and the substrate film may be prepared, which serves to buffer the difference in physical properties between the tire and the substrate film. In addition, this purpose may be achieved by controlling the hardness of silicone or rubber without the use of acrylic. Certainly, acrylic may be used within a range that does not consider the difference in physical properties from tires such that the use of acrylic is not excluded. However, there is certainly a difference in physical properties between acrylic and silicone/rubber, and in some cases, the durability of the tag may be affected.

From the first adhesive layer 110 to the third adhesive layer 150, each thereof is adopted as a component of the tag to protect the tag, thereby making it possible to manufacture a permanent tag that may be used up to the lifetime of a tire.

The parasitic element layer 140 includes a substrate film 141 and a parasitic element 143 formed on the substrate film 141. Although the parasitic element 143 is not directly coupled to the feed line of the antenna pattern, it refers to a radiation element that substantially affects the radiation pattern or impedance of an antenna. Herein, the non-contact power supply layer 120 is spaced apart from each other through the parasitic element layer 140 and the second adhesive layer 130, and radiation energy derived from the non-contact power supply layer 120 is electromagnetically coupled with the parasitic element layer 140 to operate the parasitic element 143. As a result, it is possible to prevent deterioration of the recognition performance of the tag by minimizing the influence of a bead or a metal wire embedded in a tread portion present inside the tire.

This is a characteristic derived from the technical fact that a bead or a tread portion inside the tire is composed of a metal wire, and the metal body deteriorates the radio radiation performance of RFID. As in the present invention, when the non-contact power supply layer 120 and the parasitic element layer 140 are configured to be electromagnetically coupled, deterioration due to the influence of the metal body is small and the reaction is insensitive such that there is an advantage of delaying the deterioration of the recognition performance of a tag as much as possible.

In addition, it is preferable that the tag has a circuit pattern 123 of the non-contact power supply layer 120, that is, an antenna shape having a narrow slot closed loop structure. If the antenna shape emitting radio waves is a slot closed loop structure, it is relatively insensitive to the influence of the human body and the metal body. The reason is that the slot structure forms a dielectric slot inside the surface of the metal body, and electromagnetic waves are radiated due to the performance of the electric field formed in the internal dielectric slot and the induced magnetic field, thereby preventing or delaying performance degradation by the adjacent metal body. Therefore, in the present invention, the antenna shape of a slot closed loop structure constitutes another feature of the present invention.

Meanwhile, at least one of the first adhesive layer 110, the second adhesive layer 130, and the third adhesive layer 150 may be formed by applying an adhesive to a nonwoven fabric in which a plurality of air gaps 111 are formed. This is for using a plurality of air gaps 111 formed in the nonwoven fabric, and the air gaps 111 are regions in which an air layer is formed, and serve to buffer against external impacts. In addition, the air gaps 111 also serve as an element of improving adhesion. However, the nonwoven fabric is an example of a medium in which air gaps 111 are formed, and the first adhesive layer 110 to the third adhesive layer 150 should not be interpreted to be limited to be nonwoven fabrics.

Herein, it will be described as an example that the first adhesive layer 110 is formed by applying an adhesive to a nonwoven fabric.

The nonwoven fabric has a plurality of air gaps 111 formed from the surface layer to the deep layer, and thereby, the nonwoven fabric has elasticity as a whole and some flexibility. For example, the adhesive may form an adhesive layer in a non-woven fabric by immersing the non-woven fabric in a container containing the adhesive, or may form an adhesive layer by applying the adhesive onto the non-woven fabric with a suitable tool.

However, since the adhesive is introduced from the surface layer, it is easy to fill the air gaps 111 existing in the surface layer, but it is not easy to fill the air gaps 111 existing in the deep layer. Certainly, as an example, the area where the adhesive is present is not limited to this type, but even if the adhesive is formed only on the surface layer of the nonwoven fabric, the purpose of adhesion is sufficiently achieved such that the adhesive penetrates only the surface layer.

Next, in the case of a deep layer that is not filled with the adhesive or is not sufficiently filled, a cushioning function is provided. That is, when impact or stress is applied from the outside, the air gaps 111 of the deep layer repeat contraction and restoration, canceling or mitigating such impact or stress, thereby ultimately protecting the tag and improving its lifespan.

The first adhesive layer 110 is adhered to the upper surface of the non-contact power supply layer 120 to protect the RFID chip 125 and the circuit pattern 123, and serves to adhere the protective layer 160 thereon.

Figure 5:
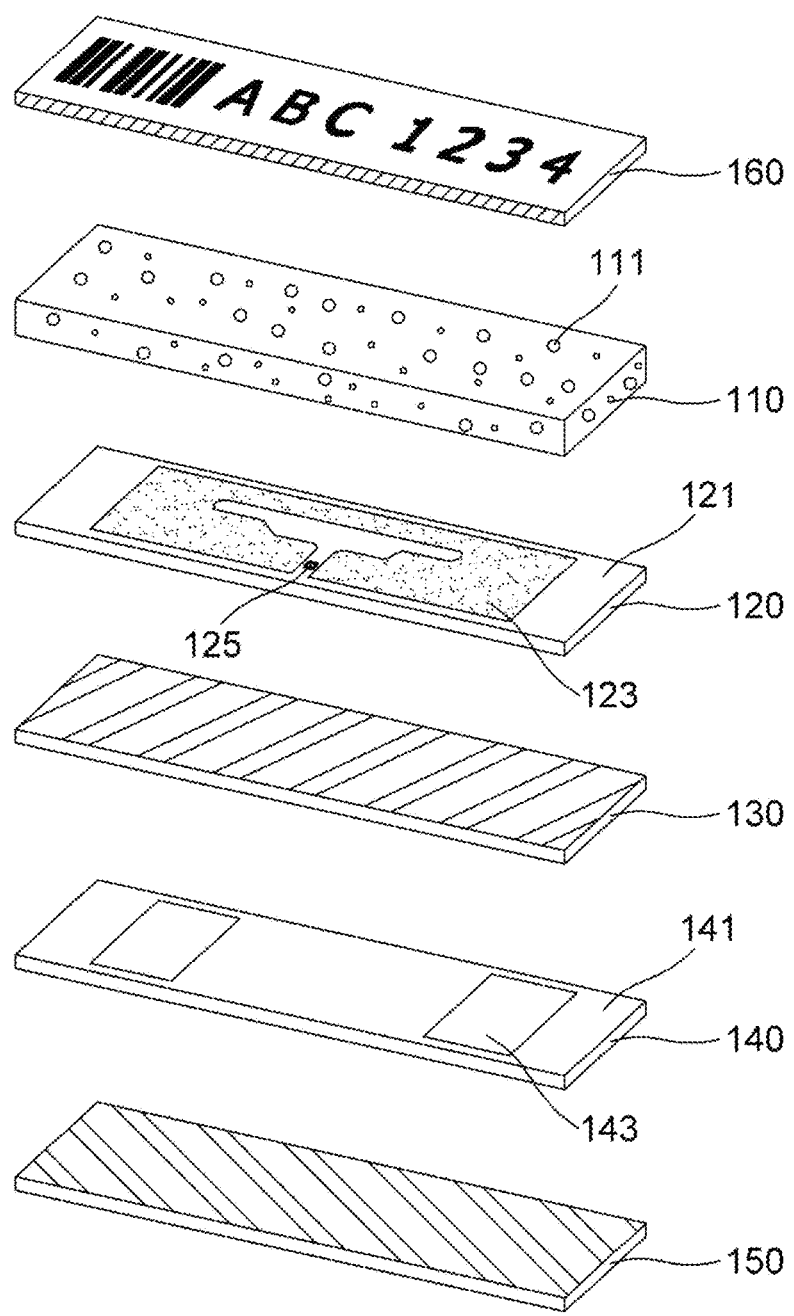
FIG. 5 is a disassembled perspective view showing that the first adhesive layer according to an exemplary embodiment of the present invention is a nonwoven fabric.
Figure 6:
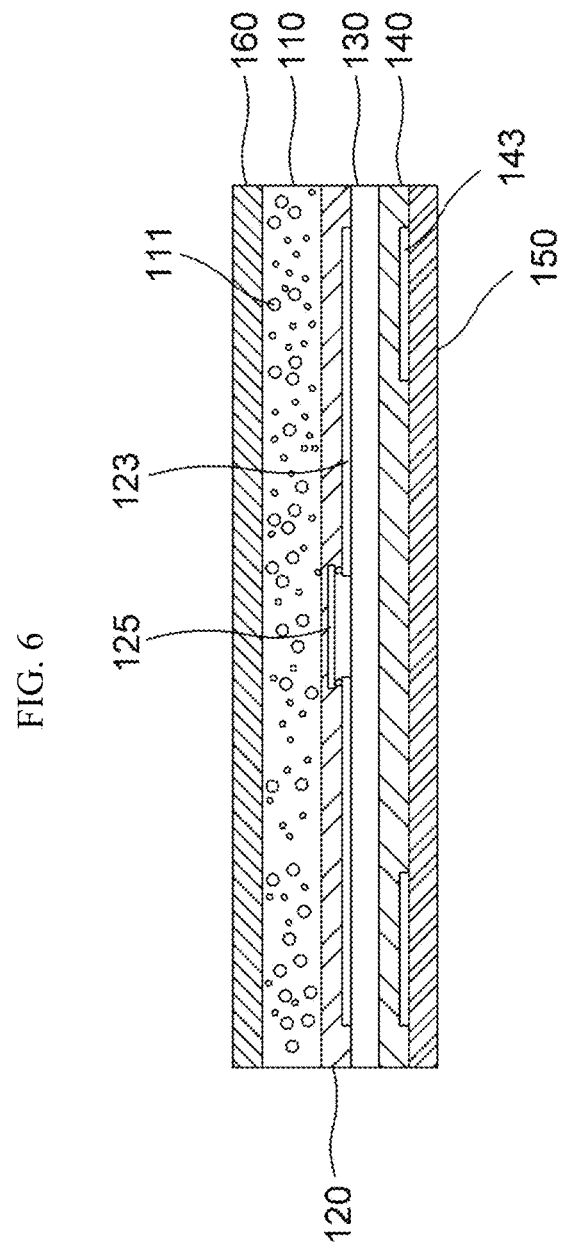
FIG. 6 is a side cross-sectional view of FIG. 5.

Hereinafter, an exemplary embodiment of the first adhesive layer 110 will be described in detail with reference to FIGS. 5 and 6.

The first adhesive layer 110 is based on a nonwoven fabric, and includes an adhesive applied to the nonwoven fabric to fill a part of the inner space of the nonwoven fabric. A plurality of air gaps 111 are formed in the nonwoven fabric, and an adhesive is mainly filled in the air gaps 111 existing in the double surface layer. Certainly, the adhesive may be filled in all of the air gaps 11*l* in the nonwoven fabric, and the adhesive filling area of the air gaps 11 is not particularly limited.

A non-woven fabric is a fiber aggregate or film bonded to each other by physical or chemical means, or mechanically or by suitable moisture or heat, not by spinning, weaving, or braiding, and it is also called a bonded fabric.

Since the nonwoven fabric is not woven, the density of the fibers is not uniform, and thus, it contains many air gaps 111 inside.

In this exemplary embodiment, the adhesive is not completely filled in the nonwoven fabric, and for example, the adhesive is not filled in the air gaps 111 existing in the deep layer such that the first adhesive layer 110 maintains elasticity. The adhesive-filled air gaps 111 also have elasticity, but the elasticity of the unfilled air gaps 111 is expected to be greater. Accordingly, the first adhesive layer 110 of the present exemplary embodiment may achieve an effect of protecting an internal element (in particular, the non-contact power supply layer 120 including the chip 125) against external impact.

In addition, to this end, for the adhesive applied to the nonwoven fabric, a product having elasticity such as acrylic or synthetic rubber may be preferably used.

Therefore, when the first adhesive layer 110 of the present exemplary embodiment is attached to the non-contact power supply layer 120 on which the circuit pattern 123 and the RFID chip 125 are formed, impacts such as compression, expansion, or the like applied from the outside are distributed throughout the first adhesive layers 110 and 170, and absorbed by the disposed plurality of air gaps 111 and the adhesive component to protect the circuit pattern 123 and the RFID chip 125.

Figure 7:
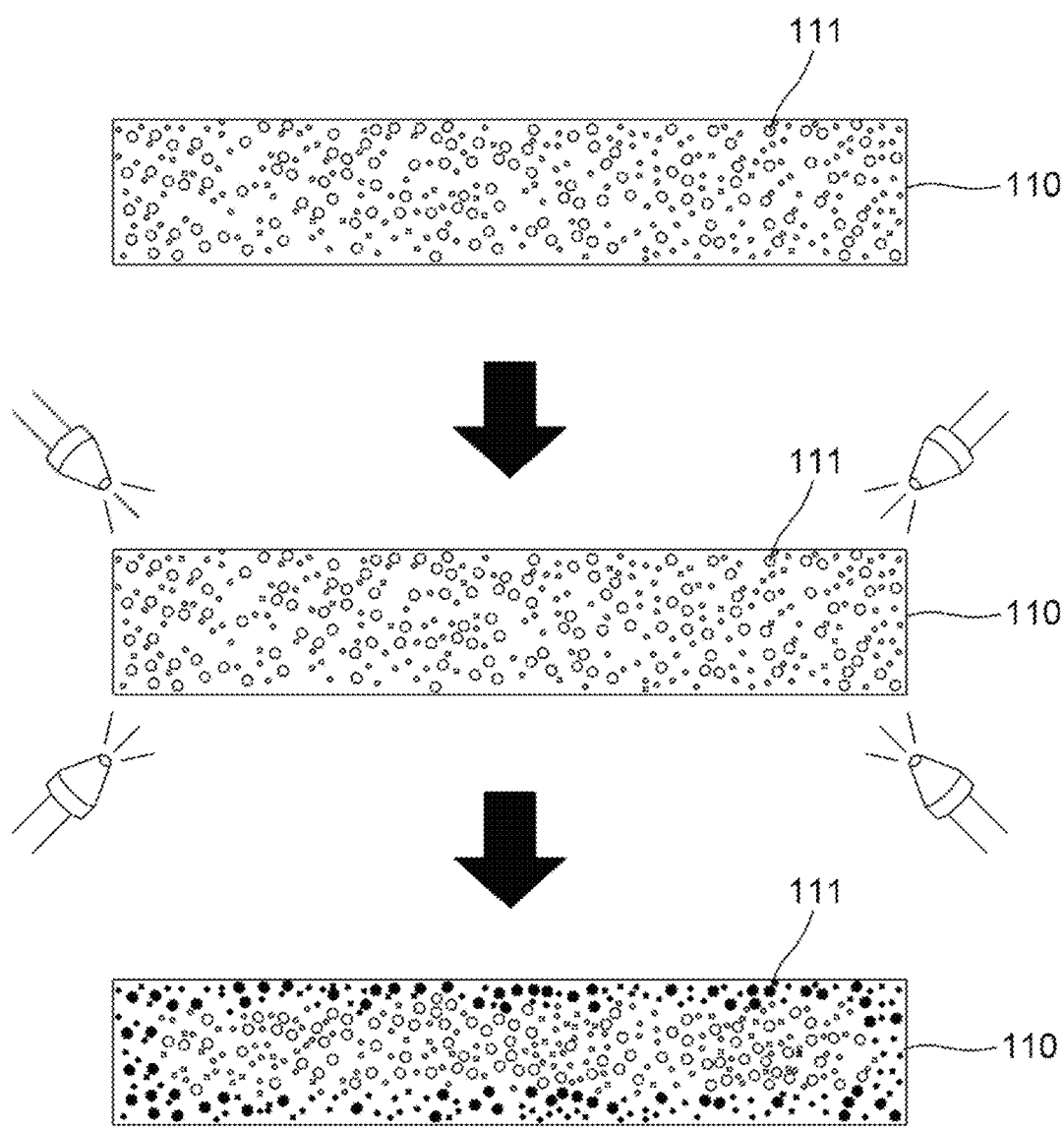
FIG. 7 is a diagram showing a form of filling an adhesive in any one of the first adhesive layer to the third adhesive layer according to an exemplary embodiment of the present invention.

FIG. 7 is a diagram showing a form of filling an adhesive in the first adhesive layer 110 according to an exemplary embodiment of the present invention. As illustrated, the adhesive was sprayed on the surface layer of a nonwoven fabric to fill the adhesive. The adhesive filled in the air gaps 111 serves to attach the non-contact power supply layer 120 under the first adhesive layer 110 and attach the protective layer on the first adhesive layer 110.

The adhesive of the first adhesive layer 110 may be made of at least one of acrylic and synthetic rubber, and a curing agent (primer) may be added to strengthen the adhesion.

A position to which the tire-attached RFID tag 100 according to an exemplary embodiment of the present invention is attached may be an inner surface of a tire, that is, an inner liner surface. In particular, in order to prevent the tag from being damaged by the metal material portion supporting a tire when the tire with the tire-attached RFID tag 100 is stuck on a loader chuck of the molding and vulcanization processes during the tire production process, it is preferable to attach the same at any location about 10 to 80 mm apart from a tire bead. In this case, the tire-attached RFID tag 100 may be sufficiently separated from the tire bead made of a metal material and the recognition performance of the tag may be improved.

Meanwhile, a wire bonding technique and a flip chip bonding technique are largely used as bonding techniques for forming an electrical connection between the chip 125 and the circuit pattern 123 on a substrate.

Herein, the wire bonding technique is a technique in which the electrical connection terminal of a chip 125 is directed to the upper portion of a substrate and the circuit pattern 123 on the upper surface of the substrate is connected to the electrical connection terminal using a wire having excellent conductivity. The flip-chip bonding technique is a technique in which the electrical connection terminal of the chip 125 is directed to the lower surface of the substrate, and the circuit pattern 123 on the substrate and the electrical connection terminal are directly faced to each other using a solder ball or the like.

The wire bonding technique is complicated in the process and requires more cost such as providing a separate wire and the like, but it has an advantage of being able to firmly attach the lower surface of the chip 125 to the upper surface of the substrate. On the other hand, the flip-chip bonding technique has a simple process and low cost, but it has a disadvantage in that the chip 125 is disposed on a solder ball such that it is not securely fixed.

It is difficult to apply the flip chip bonding technique to conventional RFID tags for tires due to the environment in which high temperature, high pressure and strong external forces are applied to the tires, and electrical connections between the RFID chip 125 and the circuit patterns 123 were formed by mostly applying the wire bonding technique.

In particular, since the attached RFID tag is attached to the surface of a tire, the external force acts strongly in the curing process of tire manufacturing and the like, and thus, the connection between the RFID chip 125 and the circuit pattern 123 must be very strong.

Therefore, in the conventional tire-attached RFID tag, the connection between the chip 125 and the circuit pattern may not be formed through flip chip bonding, and the connection between the chip 125 and the circuit pattern is formed only through the wire bonding technique.

The permanently attached UHF band RFID tire tag 100 according to an exemplary embodiment of the present invention forms a plurality of air gaps 111 in the first adhesive layer 110 such that when a strong external force acts on the RFID tag 100, a plurality of air gaps 111, in particular, air gaps 111 that are not filled with an adhesive, may absorb the external force applied to the RFID chip 125 of the non-contact power supply layer 120 itself, and through this, the RFID chip 125 of the non-contact power supply layer 120 and the circuit pattern 123 may be protected from the external force.

Accordingly, when forming an electrical connection between the RFID chip 125 and the circuit pattern 123, the permanently attached UHF band RFID tire tag 100 according to an exemplary embodiment of the present invention enables applying the flip chip bonding technique instead of wire bonding, which requires more processing time or cost.

The flip chip bonding method is used in the production of general tags, and it has not been applied in the production of tire-attached RFID tags other than general tags, and this is due to the specificity of the production method of the tire-attached RFID tag. Since air gaps and the non-contact power supply layer may function to protect against damage to the chip bonding area due to flexing motion when mounted on a vehicle, a high temperature of 200° C., and a high pressure of 30 bar, which are specialized curing conditions during the production of tire-attached RFID tags, it is preferable to introduce the flip chip bonding method in the present invention.

In addition, in order to enhance the reliability of the chip 125 portion under a rapid manufacturing process, an ultraviolet (UV) epoxy that cures quickly in time and guarantees firmness is applied to the chip portion of the tag to improve mechanical reliability of the tag chip 125 portion which is the most sensitive and less reliable.

Figure 8:
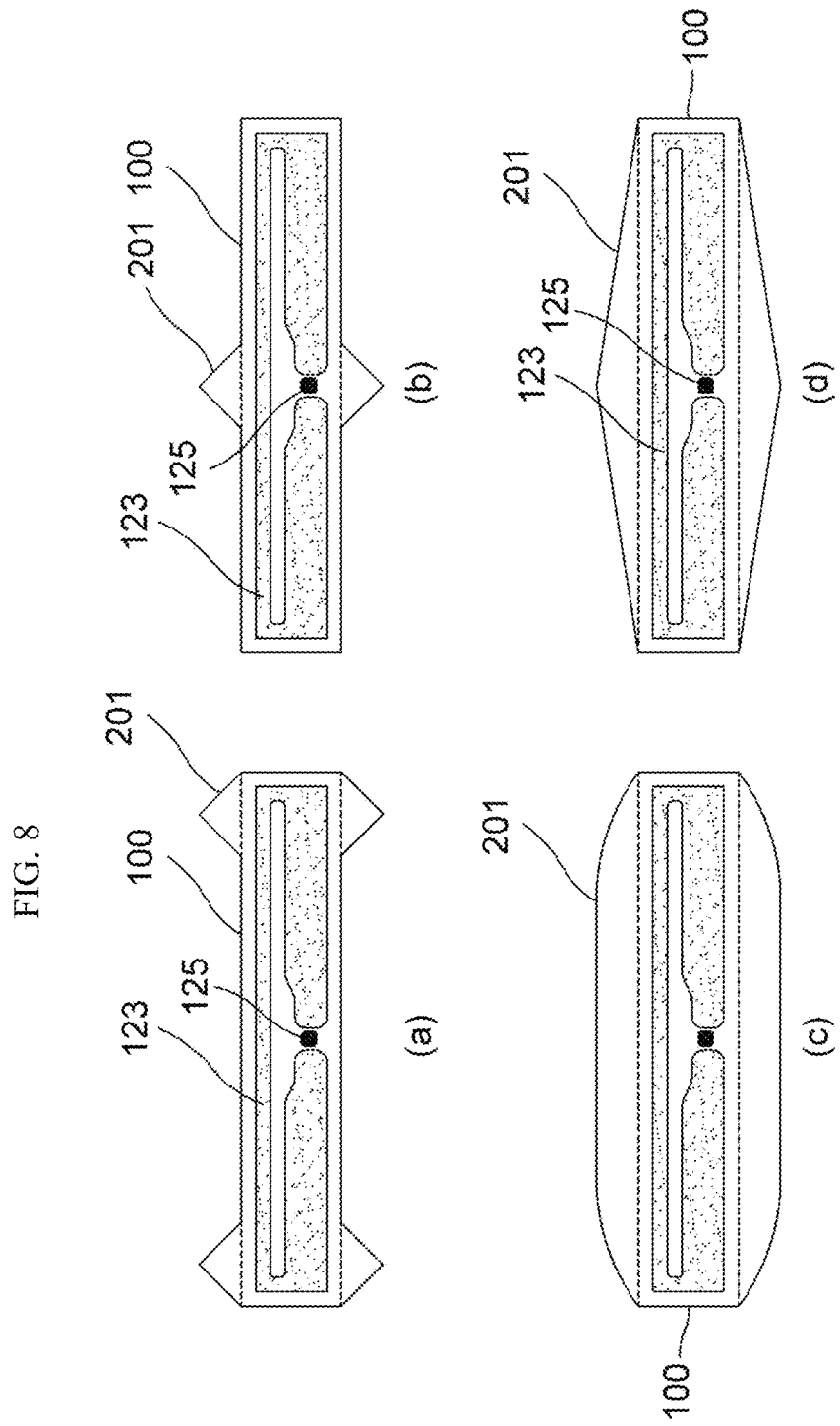
FIG. 8 is a diagram showing a protrusion provided in an UHF band RFID tag according to an exemplary embodiment of the present invention.

FIG. 8 is a diagram illustrating a protrusion 201 provided in an UHF band RFID tag according to an exemplary embodiment of the present invention.

The UHF band RFID tag 100 may be provided with a protrusion 201 in which a part of the tag 100 separated from the original release paper protrudes in order to reduce the adhesive stress of the double-sided third adhesive layer as much as possible in order to facilitate the automatic attachment of a tag by an automatic attaching machine.

Herein, the protrusion 201 may be provided at both ends of one side of the tag 100 (refer to FIG. 8(*a*)) or the center (refer to FIG. 8(*b*)), or the entire side of the tag 100 (refer to FIGS. 8(*c*) and 8(*d*)).

In addition, the protrusion 201 may be formed of at least one of triangles (refer to FIGS. 8(*a*), 8(*b*), and 8(*d*)), a semi-ellipse (refer to FIG. 8(*c*)), and a semi-circle (not shown), but the present invention is not limited thereto and may be formed in various shapes.

As such, when the protrusion 201 is provided on the tag 100, the contact area between the protrusion 201 first separated from release paper and the release paper is reduced compared to a case where the protrusion 201 is not provided, thereby facilitating the automatic tag attachment.

Figure 9:
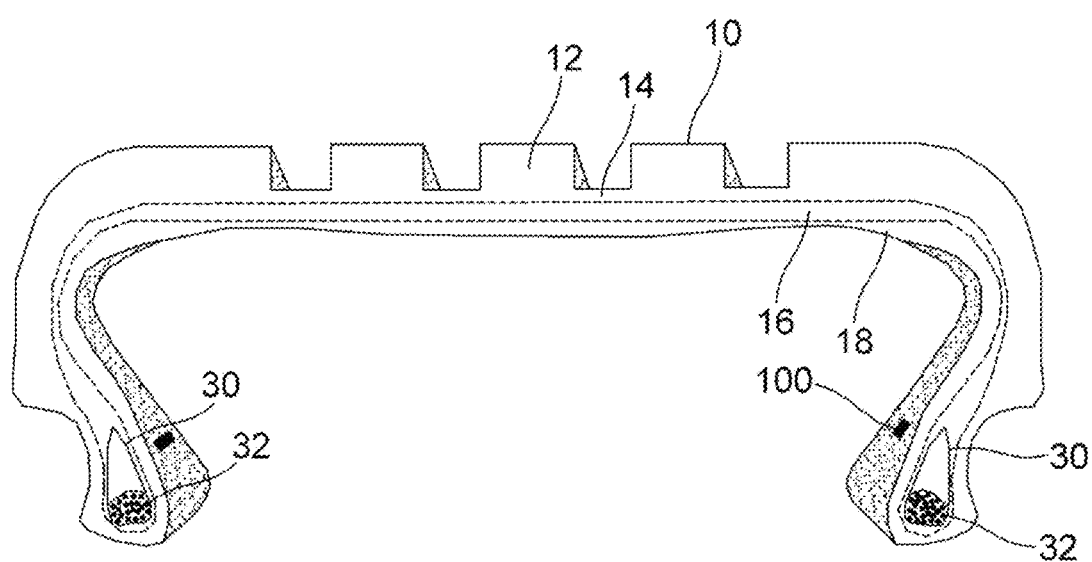
FIGS. 9 and 10 are diagrams illustrating a state in which the UHF band RFID tag illustrated in FIG. 3 is attached to a tire.
Figure 10:
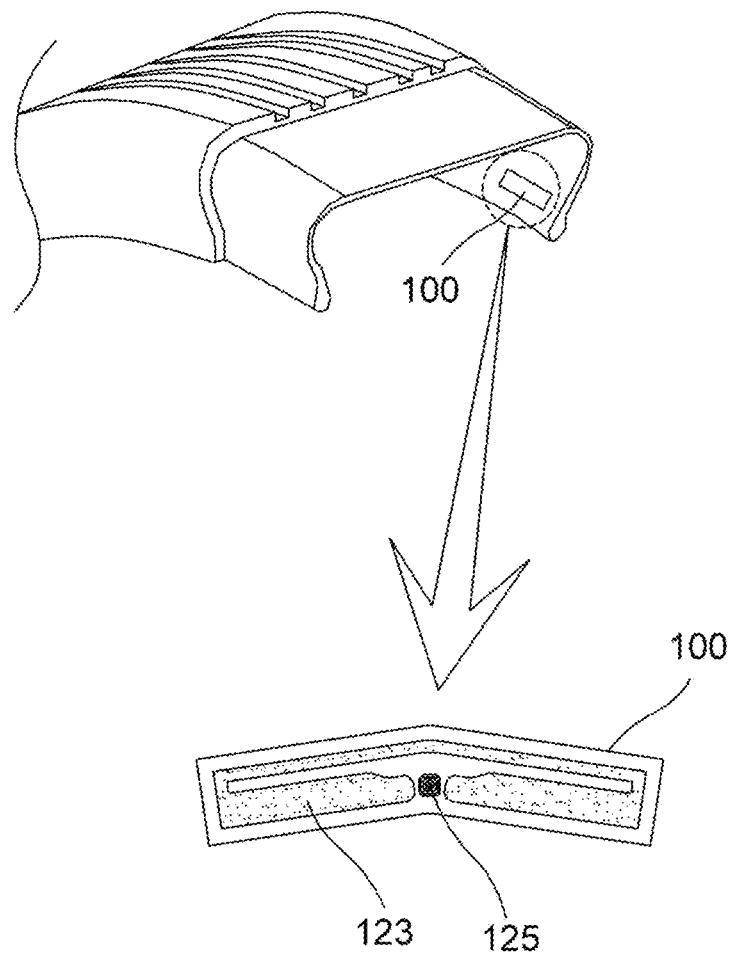

FIGS. 9 and 10 are diagrams illustrating a state in which the UHF band RFID tag illustrated in FIG. 3 is attached to a tire.

As illustrated, the tire 10 may include an outer tread 12, a cap ply 14, a belt 16, an inner lighter 18, an apex 30, a bead 32, and an RFID tag 100.

Herein, the outer tread 12 is a thick rubber layer as a road surface contact part outside the tire 10, and the cap ply 14 is a special cord sheet located inside the outer tread 12, which improves performance during driving and prevents the belt 16 from being detached.

In addition, the belt 16 is located inside the outer tread 12 and the cap ply 14 and is an iron core layer that relieves external impact, and the inner liner 18 is located on the innermost side of the tire 10 and is made of a rubber material.

In addition, the apex 30 is located on the side surface of the cross-section of the tire 10 and minimizes dispersion of the bead 32, relieves external impact, and is made of a long triangular type of a rubber material.

In addition, the bead 32 serves to fix a rim to the tire by a bundle of square or hexagonal iron cores covered with rubber on the iron core.

In addition, the UHF band RFID tag 100 according to an exemplary embodiment of the present invention is attached to the inner surface of the tire 10 inner liner 18 by an automatic attaching machine during the manufacturing process of a tire, and the center of the tag 100 may be attached to an arbitrary position spaced 10 mm to 80 mm away from the bead 32 in a horizontal direction or a vertical direction.

In addition, as illustrated in FIG. 10, when driving with tires installed on the vehicle, the UHF band RFID tag 100 according to an exemplary embodiment of the present invention may have a shape in which horizontal and vertical four sides are asymmetrical corresponding to the shape of a curved tire 10 in order to prevent separation or damage of the tag 100 attached or buried by the flexing motion of the tire.

Specifically, the length of one side of the tag 100 attached to a first diameter portion of the tire 10 may be shorter than the length of the other side attached to a second diameter portion of the tire 10, which is longer than the first diameter portion. Further, each side of the tag 100 may have a curved surface corresponding to the shape of the curved tire 10.

In this way, by forming the shape of the tag 100 to be similar to the shape of the curved tire 10, when the tag 100 is attached to the tire 10, adhesion between the tire 10 and the tag 100 may be increased.

Figure 11:
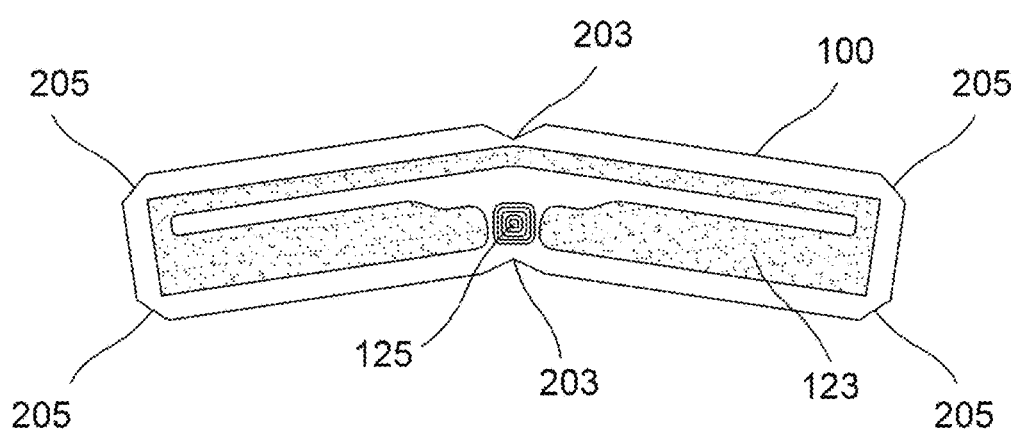
FIG. 11 is a diagram illustrating the shape of a provided indentation and both ends of the UHF band RFID tag according to an exemplary embodiment of the present invention.

In addition, as illustrated in FIG. 11, the UHF band RFID tag 100 according to an exemplary embodiment of the present invention may include an indentation 203 in which the centers of both sides are indented.

Herein, the indentation 203 may have various shapes such as a triangular, elliptical, and semicircular shape as a groove shape.

In this way, as the indentation 203 is provided in the centers of both sides of the tag 100, it is possible to prevent the center of the tag 100 from being folded during the automatic tag attachment process.

In addition, both ends 205 of the tag 100 may be formed of at least two sides. In FIG. 11, both ends 205 of the tag 100 are illustrated as having three sides, but are not limited thereto and these may be formed with more sides.

In this way, when the both ends 205 of the tag 100 are made of at least two sides, it is possible to prevent the folding of both ends 205 of the tag 100 in the process of automatically attaching the tag compared to a case of having one side.

Hereinafter, a method for manufacturing a tire-attached RFID 100 tag according to an exemplary embodiment of the present invention will be described with reference to FIGS. 1 to 11.

The manufacturing method of a tire-attached RFID tag 100 according to an exemplary embodiment of the present invention may include a step of forming a conductive antenna pattern etched or deposited on a base film 121 that does not melt at a high temperature of at least 230° C. to manufacture a non-contact power supply layer 120, a step of electrically connecting an RFID chip 125 to the conductive antenna pattern, a step of forming a parasitic element 143 on the base film 141 that does not melt at a high temperature of at least 230° C. to manufacture a parasitic element layer 140, a step of forming a first adhesive layer 110 on the non-contact power supply layer 120, a step of forming a second adhesive layer 130 between the non-contact power supply layer and the parasitic element layer 140, and a step of forming a third adhesive layer 150 on the opposite surface of a surface on which the second adhesive layer 130 of the parasitic element layer 140 is formed.

Herein, the step of forming the first adhesive layer 110 may be a step of providing a plurality of air gaps 111 and filling the air gaps 111 with an adhesive according to an exemplary embodiment.

That may be a step of filling the adhesive in the air gaps 111 placed in the surface layer of the first adhesive layer 110 among the air gaps 111.

The manufacturing method of the tire-attached RFID tag 100 according to an exemplary embodiment of the present invention may further include a step of further forming a protective layer on the first adhesive layer 110, a step of forming release paper under the third adhesive layer 150, and a step of printing or marking a barcode, letter, or number for identifying the RFID tag 100 on the protective layer 160.

In addition, the step of forming the first adhesive layer 110 may be a step of forming an adhesive layer by applying an adhesive to the upper and lower surfaces of the nonwoven fabric as a base. In this case, the adhesive may be mainly filled in the surface layer of the nonwoven fabric base, and the adhesive may be an acrylic-based adhesive.

In addition, the step of forming the second adhesive layer 130 or the third adhesive layer 150 may be, for example, a step of forming by applying an acrylic-based adhesive, a silicon (Si)-based adhesive, a mixture of acrylic and enhanced heat-resistant silicon (Si)-based adhesives, or a rubber-based adhesive on the upper and lower surfaces of PET.

In the detailed description of the present invention, specific exemplary embodiments have been described, but various modifications may be made without departing from the scope of the present invention. Therefore, the scope of the present invention is not limited to the described exemplary embodiments, and should be determined by the scope of the claims to be described below and those equivalent to the scope of the claims.

The invention claimed is:

1. A permanently attached UHF band RFID tire tag, comprising:
    a first adhesive layer;
    a non-contact power supply layer attached to a lower surface of the first adhesive layer, and comprising an antenna with a conductive antenna pattern and an RFID tag chip electrically connected to the antenna pattern;
    a second adhesive layer comprising an upper surface and a lower surface, wherein the non-contact power supply layer is seated on the upper surface of the second adhesive layer;
    a parasitic element layer attached to the lower surface of the second adhesive layer, and comprising a parasitic element configured to be operated by electromagnetic induction energy radiated from the non-contact power supply layer; and
    a third adhesive layer comprising an upper surface and a lower surface, wherein the parasitic element layer is attached to the upper surface of the third adhesive layer, and the lower surface is bonded to an inner surface of a tire, wherein the third adhesive layer comprises a material configured to cause the third adhesive layer to stay attached to the tire more securely than the first adhesive layer and the second adhesive layer, wherein the non-contact power supply layer comprising the RFID tag chip and the antenna is separated from the parasitic element layer placed between the non-contact power supply layer and the tire such that the tire's flexing motion is prevented from being directly transmitted from the tire to the non-contact power supply layer and damages to the RFID tag chip is reduced, wherein the non-contact power supply layer is spaced from the parasitic element layer such that radiation energy derived from the non-contact power supply layer is electromagnetically coupled with the parasitic element layer to operate the parasitic element, wherein the antenna of the non-contact power supply layer has a shape having a slot closed loop structure configured to form a dielectric such that recognition performance of the tag is prevented from being deteriorated due to influence of a bead or a metal wire of a tread portion in the tire, wherein the tag comprises a first side and a second side opposite to the first side, wherein the tag has a bent shape such that the first side is concavely curved and the second side is convexly curved, and the tag comprises an indentation at the center of each of the first and second sides.

2. The permanently attached UHF band RFID tire tag of claim 1, further comprising:
a protective layer attached to an upper surface of the first adhesive layer.

3. The permanently attached UHF band RFID tire tag of claim 2, wherein in order to prevent arbitrary tag damage by the user, the protective layer has an area of 1.5 to 10 times based on the total area of the non-contact power supply layer to conceal a front surface of the tag.

4. The permanently attached UHF band RFID tire tag of claim 2, wherein a barcode, letter, number or QR code for identifying the RFID tire tag and for identification redundancy in case the RFID tag is damaged is printed or marked on an upper surface of the protective layer.

5. The permanently attached UHF band RFID tire tag of claim 1, wherein at least one of the first adhesive layer to the third adhesive layer is formed by applying an adhesive to a nonwoven fabric in which a plurality of air gaps are formed.

6. The permanently attached UHF band RFID tire tag of claim 5, wherein the plurality of air gaps are locally different in the filling amount of an adhesive, and the adhesive is filled in surface air gaps more than in deep air gaps.

7. The permanently attached UHF band RFID tire tag of claim 1, wherein the adhesive applied to both surfaces of at least one of the first adhesive layer to the third adhesive layer is an acrylic-based adhesive, a silicon (Si)-based adhesive, a mixture of acrylic and enhanced heat-resistant silicon (Si)-based adhesives, or a rubber-based adhesive.

8. The permanently attached UHF band RFID tire tag of claim 1, wherein a substrate film constituting the non-contact power supply layer and the parasitic element layer consists of polyimide (PI) or polyethylene terephthalate (PET).

9. The permanently attached UHF band RFID tire tag of claim 1, wherein the tag is attached to an inner surface of a tire inner liner by an automatic attaching machine during the manufacturing process of a tire, and the center of the tag is attached to an arbitrary position 10 mm to 80 mm away from a bead.

10. The permanently attached UHF band RFID tire tag of claim 1, wherein the tag is provided with a protrusion in which a portion of the tag separated from original release paper becomes a protruding form to reduce adhesive stress of a double-sided adhesive in order to facilitate automatic attachment of the tag by an automatic attaching machine.

11. The permanently attached UHF band RFID tire tag of claim 10, wherein the protrusion is provided on both ends.

12. The permanently attached UHF band RFID tire tag of claim 1, wherein the tag has a shape asymmetrical corresponding to a curved shape of the tire.

13. The permanently attached UHF band RFID tire tag of claim 1, wherein the tag has a length of the first side attached to a first diameter portion of the tire shorter than a length of the second side attached to a second diameter portion of the tire, which is longer than the first diameter portion.

14. The permanently attached UHF band RFID tire tag of claim 1, wherein an ultraviolet (UV) epoxy is coated at a chip portion of the tag.

15. The permanently attached UHF band RFID tire tag of claim 1, wherein the tire's flexing motion is prevented from being directly transmitted to the non-contact power supply layer by placing the parasitic element layer between the non-contact power supply layer and the tire, wherein damage to the RFID tag chip is reduced thereby such that the tire tag can be used permanently.

16. The permanently attached UHF band RFID tire tag of claim 1, wherein the tag separates the non-contact power supply layer and the parasitic element layer by a second adhesive layer, and allows radiant energy transmitted from the non-contact power supply layer to be transferred to a parasitic element electromagnetically coupled to the non-contact power supply layer.

17. The permanently attached UHF band RFID tire tag of claim 1, wherein since the tag is configured such that the non-contact power supply layer and the parasitic element layer are separated and electromagnetically coupled to each other, a phenomenon is prevented in which the performance of the tag deteriorates from an effect of a bead or a metal wire of a tread portion present inside the tire.

18. The permanently attached UHF band RFID tire tag of claim 1, wherein the tag prevents a phenomenon in which the recognition performance of the tag is deteriorated due to an effect of a bead or a metal wire of a tread portion present inside the tire as the antenna shape of the non-contact power supply layer consists of a narrow slot closed loop structure.

19. The permanently attached UHF band RFID tire tag of claim 1, wherein in order to prevent arbitrary tag damage by the user, at least the first adhesive layer has an area of 1.5 to 10 times based on the total area of the non-contact power supply layer to conceal a front surface of the tag.

* * * * *